US012110087B1

(12) United States Patent
Broughton et al.

(10) Patent No.: US 12,110,087 B1
(45) Date of Patent: Oct. 8, 2024

(54) METHOD AND SYSTEM FOR REPLACING A WATERCRAFT BATTERY

(71) Applicant: BRP MARINE US INC., Clinton, MI (US)

(72) Inventors: George Broughton, Wadsworth, IL (US); James Macier, Beach Park, IL (US)

(73) Assignee: BRP Marine US Inc.

( * ) Notice: Subject to any disclaimer, the term of this patent is extended or adjusted under 35 U.S.C. 154(b) by 0 days.

(21) Appl. No.: 17/852,824

(22) Filed: Jun. 29, 2022

Related U.S. Application Data

(60) Provisional application No. 63/216,670, filed on Jun. 30, 2021.

(51) Int. Cl.
*B63H 21/17* (2006.01)
*B60L 50/60* (2019.01)
*B60L 53/80* (2019.01)
*B63H 21/30* (2006.01)

(52) U.S. Cl.
CPC .............. *B63H 21/17* (2013.01); *B60L 50/66* (2019.02); *B60L 53/80* (2019.02); *B63H 21/30* (2013.01); *B60L 2200/32* (2013.01)

(58) Field of Classification Search
CPC ................................. B63H 21/17; B60L 50/66
See application file for complete search history.

(56) References Cited

U.S. PATENT DOCUMENTS

| | | | |
|---|---|---|---|
| 5,191,228 A * | 3/1993 | Sloan ................... | B60R 25/1018 307/10.6 |
| 5,760,569 A * | 6/1998 | Chase, Jr. ........... | H01M 50/204 414/281 |
| 5,806,232 A * | 9/1998 | James .................... | A01K 91/02 43/26.1 |
| 7,452,251 B2 | 11/2008 | Boebel | |
| 7,614,925 B2 | 11/2009 | Boebel et al. | |
| 8,337,264 B2 | 12/2012 | Boebel et al. | |
| 10,124,870 B2 | 11/2018 | Bergmann et al. | |
| 10,464,651 B2 | 11/2019 | Rebele et al. | |
| 10,647,398 B2 | 5/2020 | Biebach | |
| 10,654,551 B1 | 5/2020 | Doremus | |
| 2006/0191463 A1* | 8/2006 | Little ..................... | B63B 17/02 114/292 |
| 2008/0143461 A1* | 6/2008 | Hastings ................. | H02H 7/18 335/7 |
| 2011/0226539 A1* | 9/2011 | Huss ....................... | B60L 53/80 180/65.21 |

(Continued)

*Primary Examiner* — Adi Amrany
(74) *Attorney, Agent, or Firm* — BCF LLP

(57) ABSTRACT

A method for replacing a battery and a watercraft including a hull; a deck; an electric propulsion system including: a battery disposed in a rear portion of the watercraft, and an electric motor electrically connected the battery; an opening defined at least in part by at least one of the hull and the deck, the opening providing access to a space between the hull and the deck, the opening being sized to permit the passage of the battery therethrough; and a rear module selectively connected to at least one of the hull and the deck, the rear module selectively closing the opening, the rear module, the battery, the deck, and the hull being arranged such that the battery is selectively removable through the opening when the rear module is removed from the watercraft.

20 Claims, 13 Drawing Sheets

(56) References Cited

U.S. PATENT DOCUMENTS

| | | | | |
|---|---|---|---|---|
| 2012/0125702 A1* | 5/2012 | Bergfjord | ................ | B60K 1/04 |
| | | | | 429/163 |
| 2013/0020139 A1* | 1/2013 | Kim | ........................ | B60K 1/04 |
| | | | | 903/952 |
| 2014/0287283 A1* | 9/2014 | Kimpara | ............. | H01M 50/202 |
| | | | | 429/53 |
| 2015/0114736 A1* | 4/2015 | Avganim | ................. | B60K 1/04 |
| | | | | 180/68.5 |
| 2016/0001748 A1* | 1/2016 | Moskowitz | ............. | B60L 58/26 |
| | | | | 701/22 |
| 2017/0015397 A1* | 1/2017 | Mitchell | ............... | B60P 3/1033 |
| 2018/0162447 A1* | 6/2018 | Fees | .................... | B62D 21/155 |
| 2019/0300348 A1* | 10/2019 | Wild | ....................... | B60L 50/66 |
| 2020/0067042 A1* | 2/2020 | Baumgardt | ........... | H01M 10/48 |
| 2020/0140049 A1 | 5/2020 | Gil | | |
| 2020/0255110 A1 | 8/2020 | Doremus et al. | | |
| 2020/0255112 A1 | 8/2020 | Doremus et al. | | |
| 2020/0377186 A1* | 12/2020 | Thompson | .......... | H01M 50/249 |
| 2020/0406780 A1* | 12/2020 | Hassounah | ........... | B60L 53/305 |

* cited by examiner

METHOD AND SYSTEM FOR REPLACING A WATERCRAFT BATTERY

CROSS-REFERENCE

The present application claims priority to U.S. Provisional Patent Application No. 63/216,670, entitled "Method and System for Replacing a Watercraft Battery," filed on Jun. 30, 2021, the entirety of which is incorporated herein by reference.

FIELD OF TECHNOLOGY

The present technology relates to watercraft, and more specifically to watercraft having a battery.

BACKGROUND

Personal and recreational watercraft having electric propulsion systems are becoming more common, with upkeep of various components, for instance batteries, becoming a more common concern. Batteries for use with electric marine motors and especially inboard electric propulsion systems may have a shorter lifetime than the hull, deck, and other main components of the watercraft.

When batteries are integrated into the watercraft, for example under the deck, replacement of the battery at the end of the battery life can be complicated and costly. In some cases, this may require removal of portions of the deck, or lifting the deck completely in some designs. While the battery could be disposed above the deck to avoid this problem, there are space and weight distribution advantages to placing the battery below the deck.

Thus, there is a desire for a recreational watercraft configured for battery replacement.

SUMMARY

It is an object of the present technology to ameliorate at least some of the inconveniences present in the prior art.

According to one aspect of the present technology, there is provided a watercraft arranged for allowing battery replacement, as well as a method for replacing a battery in a watercraft. The watercraft includes a rear module that is selectively connected to and disconnected from the hull and deck, which when removed exposes an opening between the hull and deck. The battery is disposed in a rear portion of the watercraft, between the hull and the deck. The battery is arranged to the translatable out of and into the opening. In this way, the battery can be replaced without requiring disassembly of the watercraft beyond removal of the rear module. The deck includes one or more access hatches to allow disconnection of the battery from the other electronic components (including the motor) before removal of the battery. The battery of the present technology also includes a manual disconnect switch disposed on a raised portion of the battery. The raised portion and the switch extend above a top surface of the deck, such that the battery can be disactivated prior to opening the rear module or the access hatches.

According to an aspect of the present technology, there is provided a watercraft including a hull; a deck disposed above the hull; an electric propulsion system including: a battery disposed in a rear portion of the watercraft at least partially between the hull and the deck, and an electric motor electrically connected the battery; an opening defined at least in part by at least one of the hull and the deck, the opening providing access to a space between the hull and the deck, the opening being sized to permit the passage of the battery therethrough; and a rear module selectively connected to at least one of a rear end portion of the hull and a rear end portion of the deck, the rear module selectively closing the opening, the rear module, the battery, the deck, and the hull being arranged such that the battery is selectively removable through the opening when the rear module is removed from the watercraft.

In some embodiments, the watercraft further includes at least one access hatch defined in the deck, the access hatch being arranged to selectively open to allow access to at least one connection point on the battery.

In some embodiments, the access hatch at least partially vertically overlaps with the battery.

In some embodiments, the watercraft further includes a plurality of connection components connecting the battery to other portions of the electric propulsion system, at least one of the plurality of connection components connecting to the battery at the at least one connection point.

In some embodiments, the plurality of connection components includes at least one of a power cable, a coolant hose, a charging cable, and a digital communications cable.

In some embodiments, the watercraft further includes a battery support structure connected to at least one of the hull and the deck, the battery being received on the battery support structure.

In some embodiments, the watercraft further includes at least one battery subframe connected to the battery, the at least one battery subframe being selectively connected to the battery support structure.

In some embodiments, the at least one battery subframe includes: a left riser connected to a left side of the battery, and a right riser connected to a right side of the battery; the left riser is selectively fastened to a left side of the battery support structure by at least one left fastener; and the right riser is selectively fastened to a right side of the battery support structure by at least one right fastener.

In some embodiments, the battery is connected to the left riser and the right riser by a plurality of brackets; and at least one of the plurality of brackets includes a rubber mount for damping vibration transfer to the battery.

In some embodiments, front ones of the left and right fasteners are each a cotter pin fastening a front portion of a corresponding one of the left riser and the right riser to the battery support structure, and rear ones of the left and right fasteners are each a bolt fastening a rear portion of the corresponding one of the left riser and the right riser to the battery support structure.

In some embodiments, a rear portion of the battery extends upward higher than a top surface of the deck; and the rear portion of the battery is disposed rearward of a rear edge of the deck.

In some embodiments, the rear module includes: a transom plate for covering the opening; and a transom beam connected to the transom plate.

In some embodiments, the watercraft further includes at least one left longitudinal rigid member connected to and extending longitudinally along a left, top side of the hull; at least one right longitudinal rigid member connected to and extending longitudinally along a right, top side of the hull; and the transom beam is connected to the at least one left longitudinal rigid member and the at least one right longitudinal rigid member.

In some embodiments, the watercraft further includes a rudder assembly selectively connected to the rear module.

In some embodiments, a longitudinal length of the hull is at least 4 meters.

In some embodiments, the longitudinal length of the hull is less than 10 meters.

In some embodiments, the watercraft further includes a pair of pontoon tubes connected to at least one of the hull and the deck.

In some embodiments, the battery includes a manual disconnect switch for deactivating the battery.

According to another aspect of the present technology, there is provided a method for replacing a battery of an electric propulsion system in a watercraft. The method includes removing a rear module of the watercraft for opening a rear opening defined in a rear portion of the watercraft; disconnecting the battery from other portions of the electric propulsion system; translating the battery rearward out of the rear portion through the rear opening to remove the battery from the watercraft; inserting a replacement battery into the rear portion of the watercraft through the rear opening; connecting the replacement battery to the other portions of the electric propulsion system; and connecting the rear module to the watercraft to close the rear opening.

In some embodiments, the method further includes, prior to translating the battery rearward, unfastening at least one battery riser from a battery support structure, the at least one battery riser being connected to the battery, the battery support structure being connected to and supported by the hull.

In some embodiments, the at least one battery riser includes a first riser and a second riser; and unfastening the at least one battery riser from the battery support structure includes: removing two fasteners connecting the first riser to the battery support structure and removing two fasteners connecting the second riser to the battery support structure.

In some embodiments, the method further includes, following inserting the replacement battery into the rear portion, fastening a first replacement battery riser to the battery support structure; and fastening a second replacement battery riser to the battery support structure.

In some embodiments, the method further includes, prior to removing the rear module, at least partially disconnecting a rudder assembly from the watercraft, the rudder assembly being selectively connected to the watercraft rearward of the rear module.

In some embodiments, the method further includes disactivating the battery prior to disconnecting the battery from the other portions of the electric propulsion system.

For purposes of this application, terms related to spatial orientation such as forwardly, rearwardly, longitudinally, upwardly, downwardly, laterally, left, and right, are as they would normally be understood by an operator in the watercraft and facing a bow of the watercraft. Terms related to spatial orientation when describing or referring to components or sub-assemblies of the watercraft, separately from the watercraft, should be understood as they would be understood when these components or sub-assemblies are mounted to the watercraft, unless specified otherwise in this application.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

It should be noted that the Figures may not be drawn to scale.

DETAILED DESCRIPTION

Figure 1:
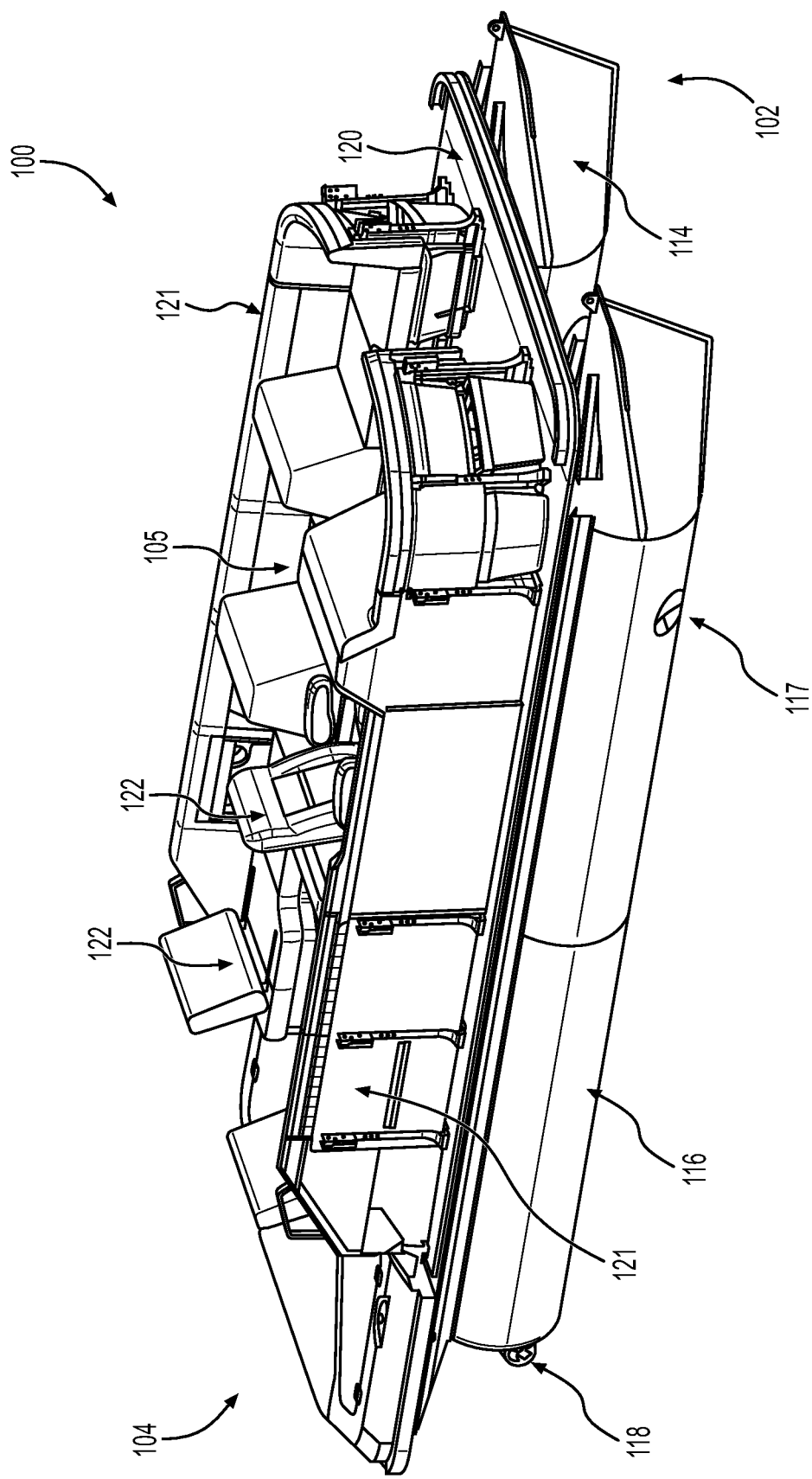
FIG. 1 is a front, right side perspective view of a watercraft according to a non-limiting embodiment of the present technology.
Figure 2:
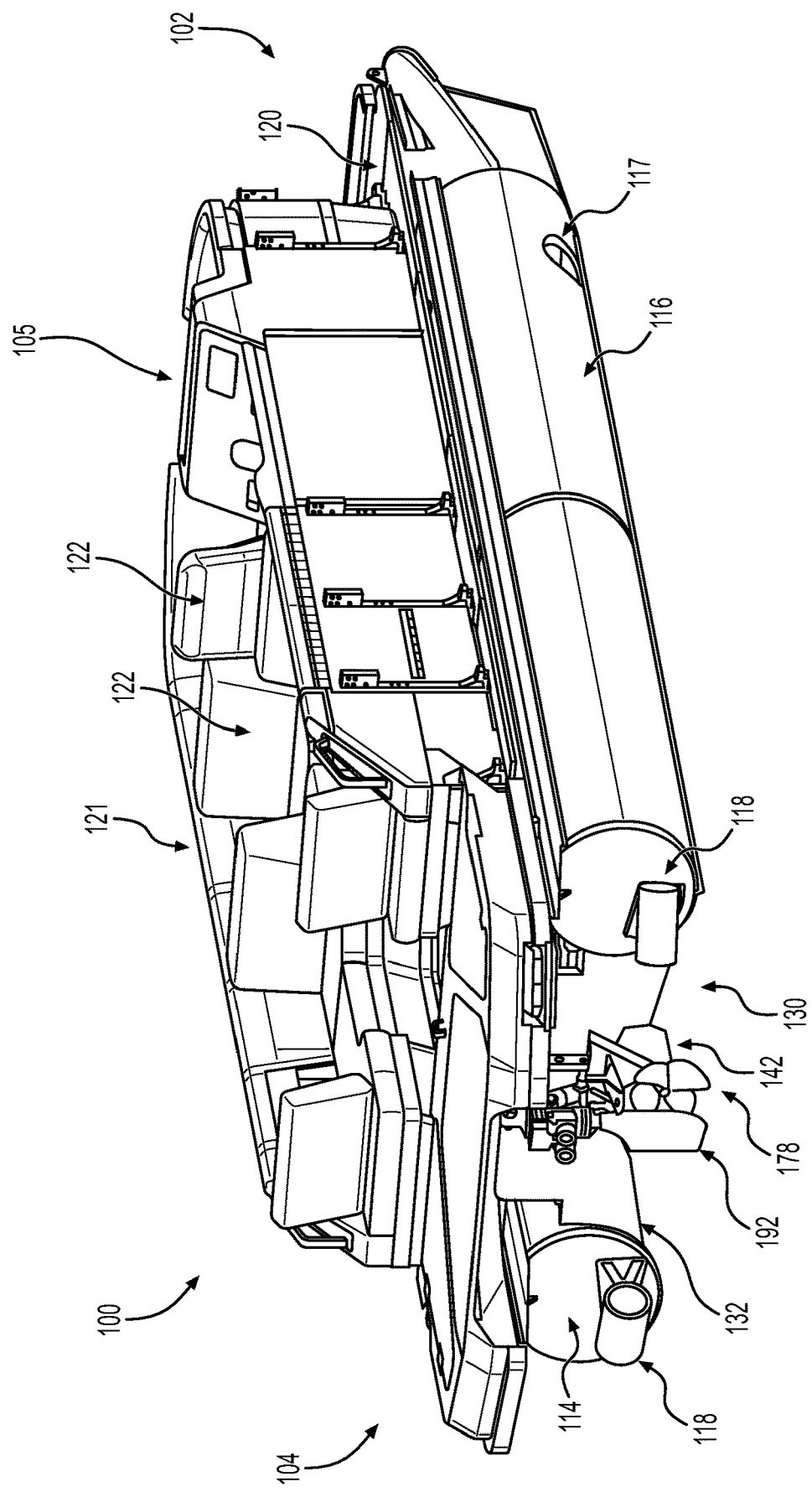
FIG. 2 is a rear, right side perspective view of the watercraft of FIG. 1.

A watercraft 100 in accordance with one embodiment of the present technology is shown in FIGS. 1 and 2. The following description relates to one example of a watercraft, notably a pontoon boat 100 with an inboard electric propulsion system 150. Those of ordinary skill in the art will recognize that there are other known types of watercraft incorporating different designs and that at least some aspects of the present technology would encompass these other types of watercraft, including for example watercraft that are not pontoon boats.

The watercraft 100 has a front end 102, also referred as a bow 102, and a rear end 104, also referred to as a stern 104. The watercraft 100 includes a pair of sealed pontoon tubes, also referred to as pontoons: a left tube 114 and a right tube 116. Each tube 114, 116 includes a rear-mounted thruster 118 and a forward thruster 117 disposed in a forward portion of the tubes 114, 116 for aiding in handling operation of the watercraft 100. In some embodiments, one or both of the thrusters 117, 118 could be omitted.

The watercraft 100 includes a deck 120 supported by the tubes 114, 116. The deck 120 is formed from a composite polymer panel covered by watercraft carpeting, although the particular materials forming the deck 120 could vary in different embodiments. For example, wood panels could be used to for the deck 120, as is common in conventional pontoon boats. The deck 120 has an upper surface for supporting occupants, as well as accessories and accommodations of the watercraft 100 (e.g., seating, command console, etc.). In the illustrated embodiment, the deck 120 receives thereon various railing structures 121 and seating structures 122, although the particular arrangement could vary.

Figure 3:
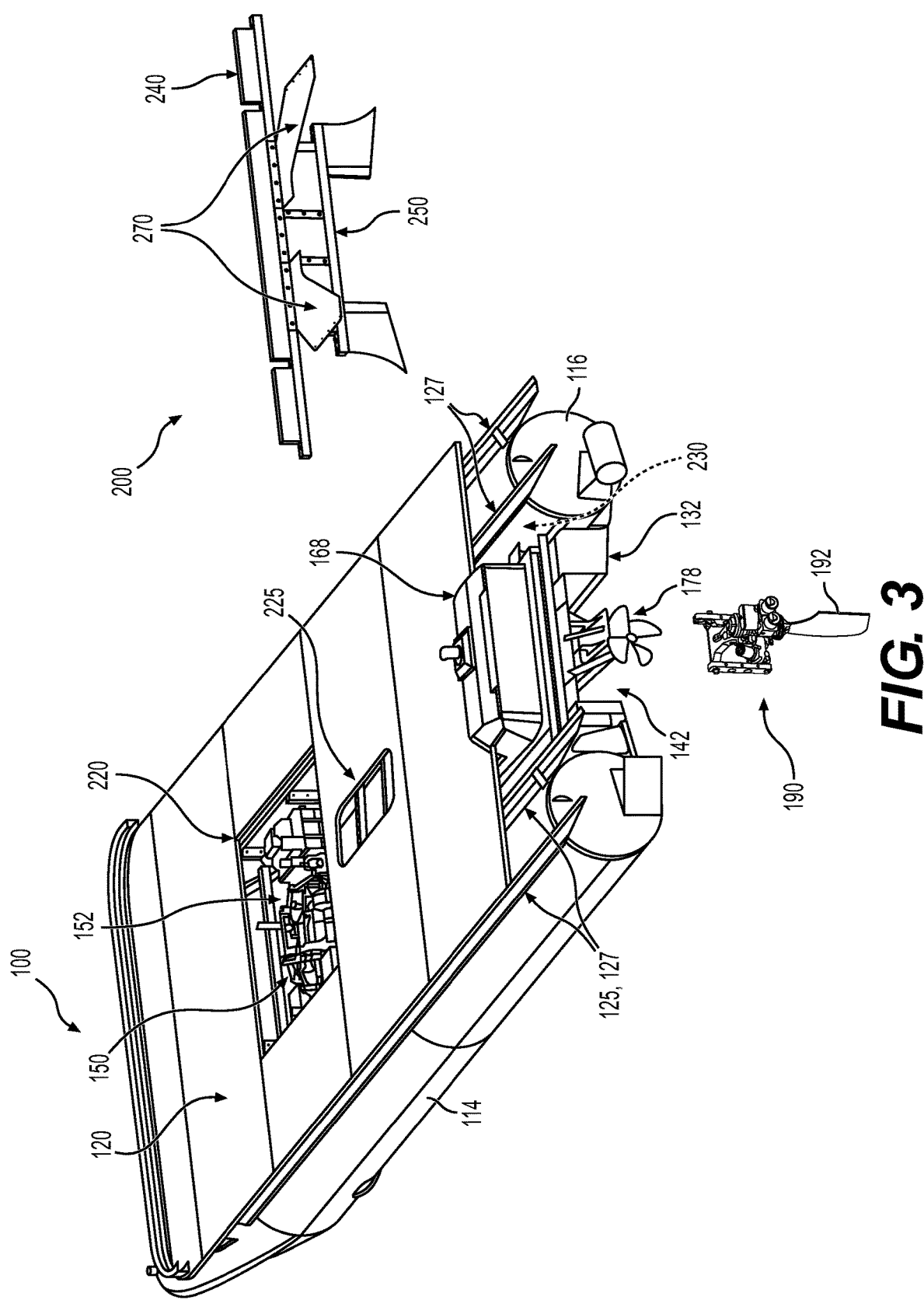
FIG. 3 is a top, rear, left side perspective view of portions of the watercraft of FIG. 1, with a rear portion of the watercraft shown in exploded view.

With additional reference to FIG. 3, the watercraft 100 includes two access hatches 220, 225 defined in the deck 120, specifically a forward access hatch 220 and a central access hatch 225. The hatches 220, 225 are illustrated in an open arrangement; covers, not shown, are generally included with the watercraft 100 for selectively closing the hatches 220, 225.

The present embodiment of the watercraft 100 includes a support structure 125 extending over and between the tubes 114, 116 for receiving the deck 120. The support structure 125 is formed from four longitudinal rigid members 127 connected to the left tube 114 and the right tube 116, as well as a plurality of brackets (not shown) and one or more lateral rigid members (not shown), commonly referred to as deck risers. Each lateral member is connected by its end portions to right and left rigid members 127 by one of the brackets. It is contemplated that in some embodiments of the watercraft 100, elements of the support structure 125 could be omitted, such as the deck risers, or that the support structure 125 could be omitted in its entirety. For example, the deck 120 could be configured and arranged to connect directly to the tubes 114, 116.

The watercraft 100 also includes a hull 130 disposed below the deck 120 and between the left and right tubes 114, 116. The hull 130 is connected to a bottom side of the deck 120 near the front and rear ends 102, 104 of the watercraft 100 and to the pair of tubes 114, 116. It is contemplated that the hull 130 could be connected to the deck 120 and/or the tubes 114, 116 with rivets, bolts and/or welds, although other means of connection are possible. In some embodiments, it is also contemplated that the hull 130 could be connected directly to the support structure 125. It is also contemplated that the hull 130 could be connected to only the deck 120 or only the tubes 114, 116. It is further contemplated that in some embodiments, the tubes 114, 116 could be omitted and compensated for by the hull 130. In such embodiments, the hull 130 could be formed to occupy a volume equal to that of the tubes 114, 116 and the hull 130 of the illustrated embodiments.

The hull 130 has a lower, outer surface 132 arranged to contact water when the watercraft 100 is in use. The outer surface 132 extends between the tubes 114, 116 and defines a channel 142 in the hull 130. In some embodiments, the outer surface 132 could include outer portions of all or parts of the pontoons 114, 116. In embodiments where the pontoons 114, 116 are omitted, it is also contemplated that the outer surface 132 could extend over an entirety of a lower portion of the watercraft 100.

The channel 142 extends along the center and bottom of the watercraft 100. It is contemplated, depending on the exact dimensions of the watercraft 100, that the channel 142 could be defined by more or less of the outer surface 132 in some embodiments. Briefly, the channel 142 aids in providing adequate water flow to an inboard motor-driven propeller 178, disposed slightly rearward of the channel 142 (described further below). The exact width of the channel 142 could therefore depend on various factors, including but not limited to: operational details of the propeller 178, size and weight of the watercraft 100, and other hydrodynamic factors. In some embodiments of the present technology, it is also contemplated that the channel 142 could be omitted.

The outer surface 132 extends laterally inward and slightly upward from each tube 114, 116 toward the channel 142. The exact form of the outer surface 132 used in any given embodiment of the watercraft 100 could depend on numerous details specific to the embodiment of the watercraft 100, including but not limited to: weight of the watercraft 100, operational details of the propeller 178, and other hydrodynamic factors. It is contemplated, for example, that another embodiment of a hull could have a differently shaped outer surface, include the form of the channel and the angles (in both lateral and longitudinal orientations) of inclined surfaces. While the cross-sectional shapes of the channel 142 illustrated herein is generally rectangular in form, it is also contemplated that the cross-sectional shape of the channel could vary in different embodiments. In the present embodiment, an overall longitudinal length 146 of the hull 130 (see FIG. 4) is approximately 6 meters. The exact length 146 could vary in different embodiments, with the length 146 preferably being at least 4 meters and less than 10 meters.

While the hull 130 is described herein as a hull having a channel, it is contemplated that the illustrated embodiment could also be considered a watercraft 100 having a multi-hull 130. Considered in this terminology, the multi-hull 130 would then include a left hull 107 and a right hull 109 (identified thusly in FIG. 2), with the channel 142 defining the space between the hulls 107, 109. It is also contemplated that the present technology could be applied to a watercraft with buoyancy maintained only by a hull, i.e. where the pontoons are omitted. It is contemplated that in some embodiments, the hull 130 could be a monohull.

With additional reference to FIG. 4, between the hull 130, the deck 120, and the tubes 114, 116 is defined a volume 188 (or a space 188) of the watercraft 100 in which are received components of the inboard electric propulsion system 150, as will be described in further detail below. In at least some embodiments, edges between the hull 130, the deck 120, and the tubes 114, 116 are not sealed to reduce complexity of construction of the watercraft 100, although the edges may be sealed in some other embodiments.

Figure 6:
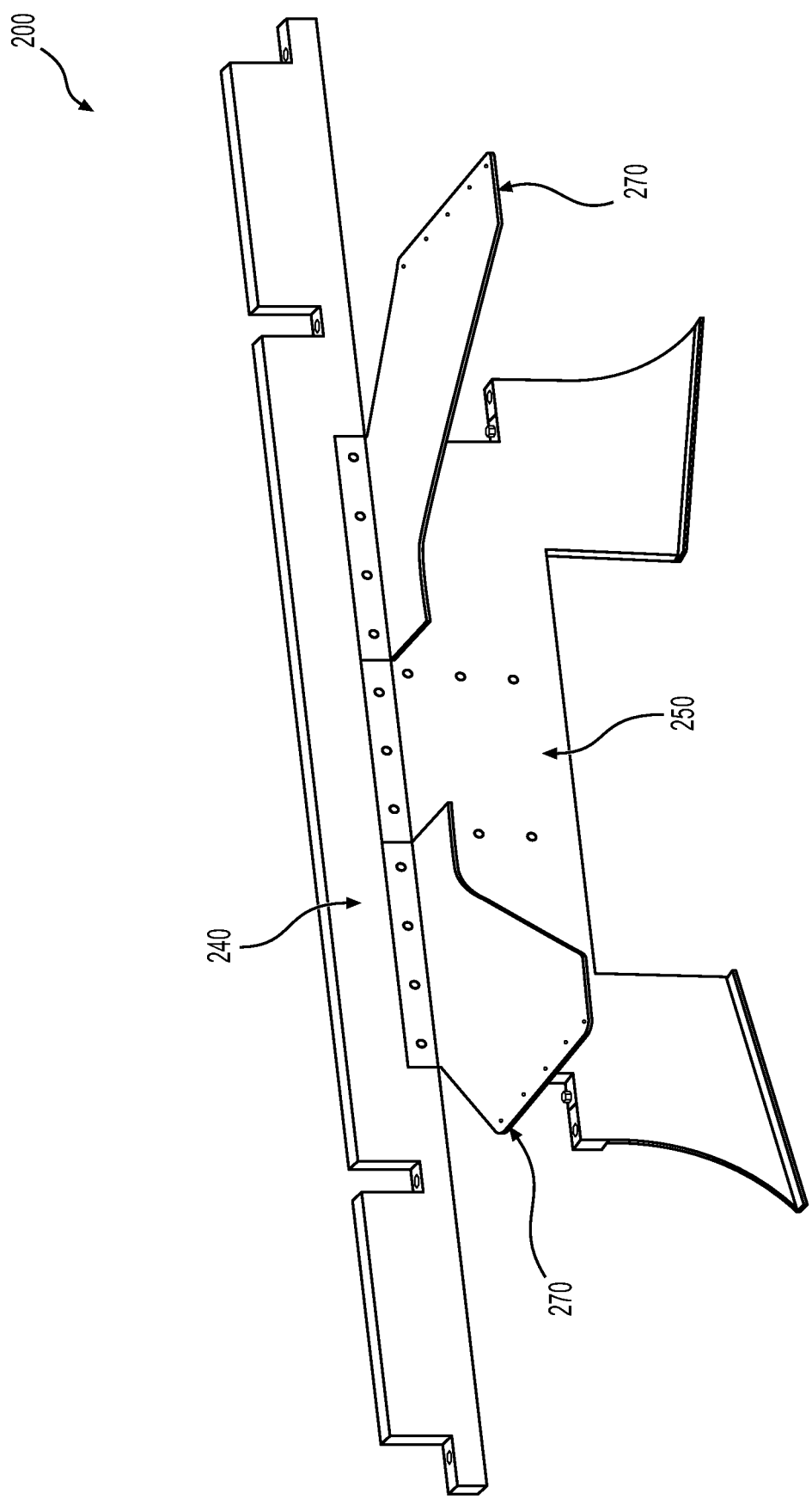
FIG. 6 is a rear, left side perspective view of a rear module of the watercraft of FIG. 1.
Figure 7:
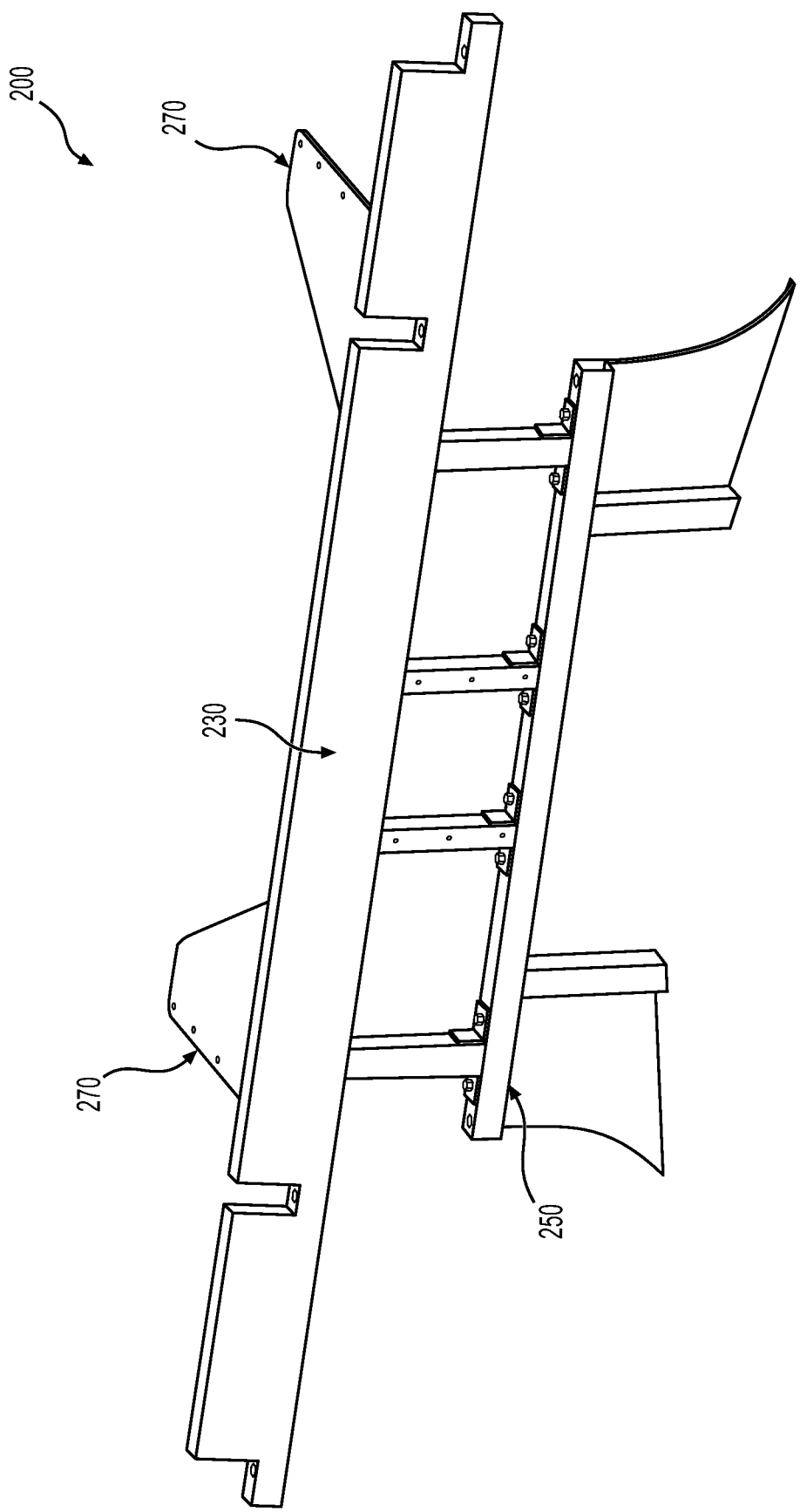
FIG. 7 is a front, left side perspective view of the rear module of FIG. 6.

As shown in FIG. 3, according to the present technology, the watercraft 100 also includes an opening 230 providing access to the space 188 between the hull 130 and the deck 120 and a rear module 200 for selectively partially closing the opening 230. The opening 230 is defined at the rear end 104 at least partially by the hull 130 and the deck 120. The rear module 200 is illustrated in place on the watercraft 100, as connected to the hull 130, in FIG. 5. The rear module 200 is illustrated separated from remaining portions of the watercraft 100 in FIG. 3, as well as in isolation in FIGS. 6 and 7. As can be seen in the Figures, the rear module 200 does not form a closed exterior surface with the deck 120 and the hull 130; a portion of a battery 156 (described further below) extends between the rear of the deck 120 and the rear module 200. It is contemplated, however, that in some embodiments that the deck 120 could extend rearward to connect directly to the rear module 200 and that the rear module 200 would selectively fully close the opening 230.

The rear module 200 includes a transom beam 240. The beam 240, when installed on the watercraft 100, is connected rearward of the deck 120 to the longitudinal members 127. In the present embodiment, the rear module 200 is connected to the deck 120 via the support members 127 and the beam 240. In some embodiments, the transom beam 240 could be additionally or alternatively connected to and/or in contact with a rear edge of the deck 120 depending on the arrangement of the propulsion system 150 as will be described further below.

The rear module 200 also includes a transom plate 250 for covering portions of the opening 230 below the transom beam 240. The transom beam 240 and the transom plate 250 are fastened together. In some embodiments, it is contemplated that the beam 240 and the plate 250 could be integrally formed. When installed on the watercraft 100, the transom plate 250 is connected to a rear edge of the hull 130 and partially closes the opening 230. Selective removal of the rear module 200 for accessing components disposed in the volume 188 is described in further detail below.

Figure 8:
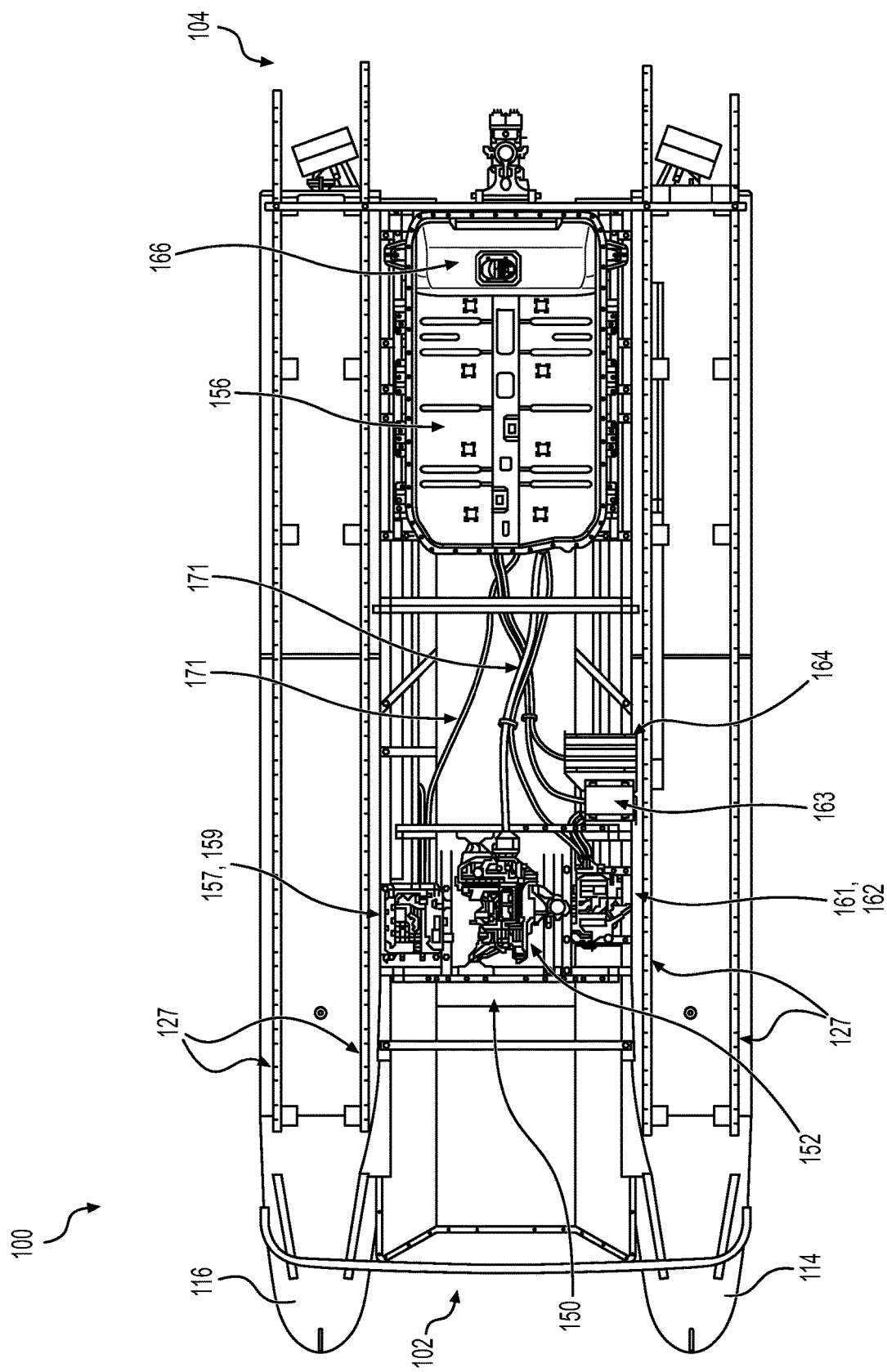
FIG. 8 is a top plan view of pontoons, a hull, and an electric propulsion system of the watercraft of FIG. 1, with the deck removed.

Returning to FIGS. 3 to 5 and with additional reference to FIG. 8, the watercraft 100 includes the inboard electric propulsion system 150 for propelling the watercraft 100. The propulsion system 150 is disposed below the deck 120, with portions of the system 150 being received in the volume 188 defined between the hull 130, the deck 120, and the tubes 114, 116.

The propulsion system 150 includes a plurality of electrical components disposed between the hull 130 and the deck 120. As is mentioned above, seams formed at boundaries between the hull 130, the deck 120, and/or the tubes 114, 116 are not necessarily sealed and are water-permeable. As such, the electrical components of the system 150 are waterproof to an Ingress Protection Code standard of IP67. It is contemplated that different standards could be applied, depending on the particular embodiment or desired application, and that the seams formed at boundaries between the hull 130, the deck 120, and/or the tubes 114, 116 could be sealed.

The electrical components of the system 150 include an electric motor 152 disposed in a forward portion of the watercraft 100. The electric motor 152 is disposed above the outer surface 132 of the hull 130 and below the deck 120. An acceleration lever (not shown) is operatively connected to the electric motor 152 for controlling operation of the motor 152. The acceleration lever is located on a command console (not illustrated), also referred to as a helm, provided on the deck 120. It is contemplated that different input and control mechanisms could be used for controlling the motor 152 by an operator.

In order to power the motor 152, the electronic components of the system 150 also include a battery pack 156, referred to herein generally as the battery 156, disposed in a rear portion of the watercraft 100. Similarly to the motor 152, the battery 156 is disposed above the outer surface 132 of the hull 130. Portions of the battery 156 are disposed below the deck 120. With additional reference to FIG. 9, the battery 156 includes a rear portion 166 which protrudes farther upward than forward portions of the battery 156. The rear portion 166 of the battery 156 extends upward higher than a top surface of the deck 120 and is disposed rearward of a rear edge of the deck 120. It is contemplated that in some embodiments of the battery 156, the upper rear portion 166 could be omitted and/or the battery 156 could be differently shaped, and the battery 156 could fit fully below the deck 120.

Figure 9:
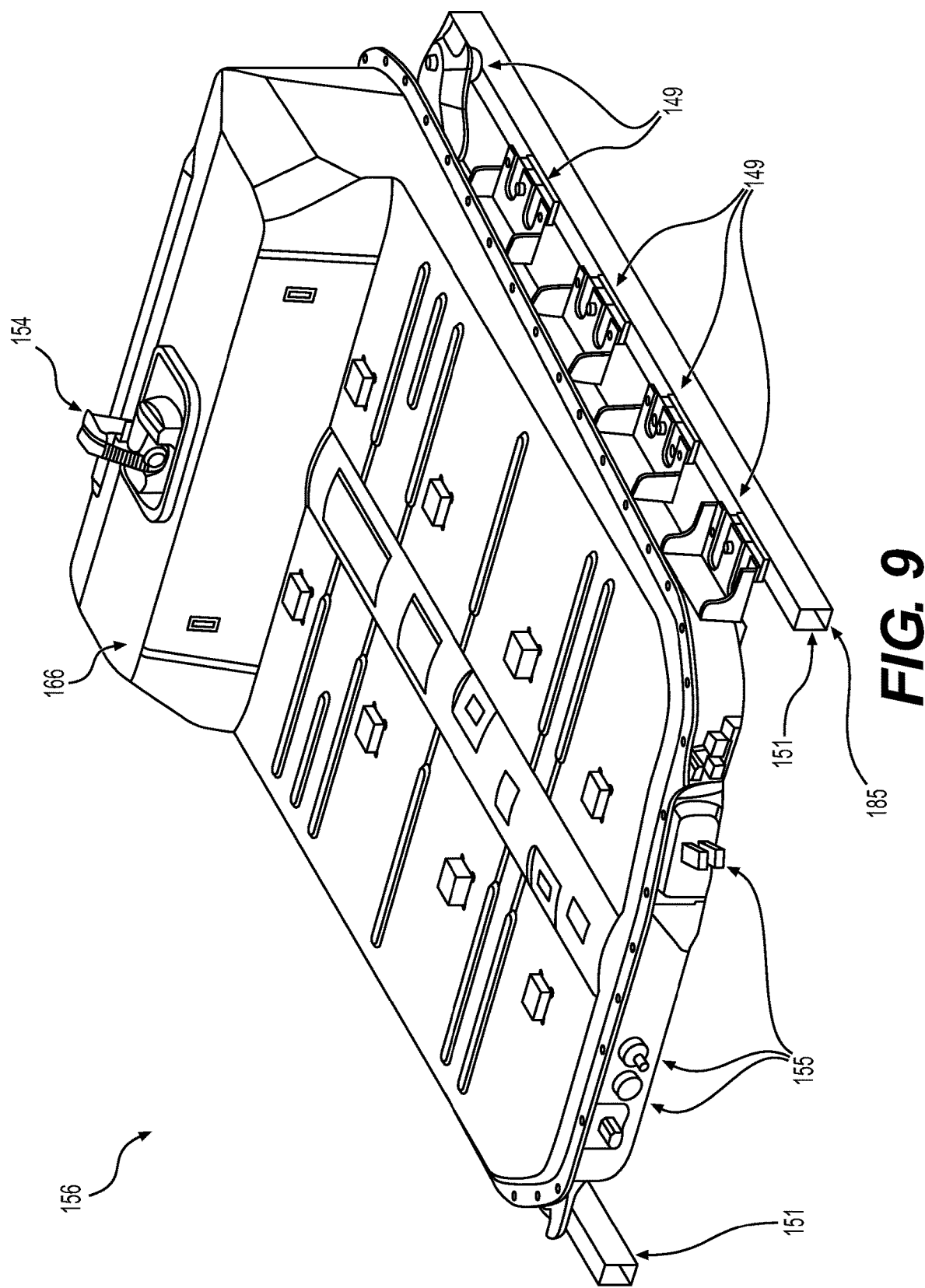
FIG. 9 is a front, left side perspective view of a battery of the electric propulsion system of FIG. 8.
Figure 10:
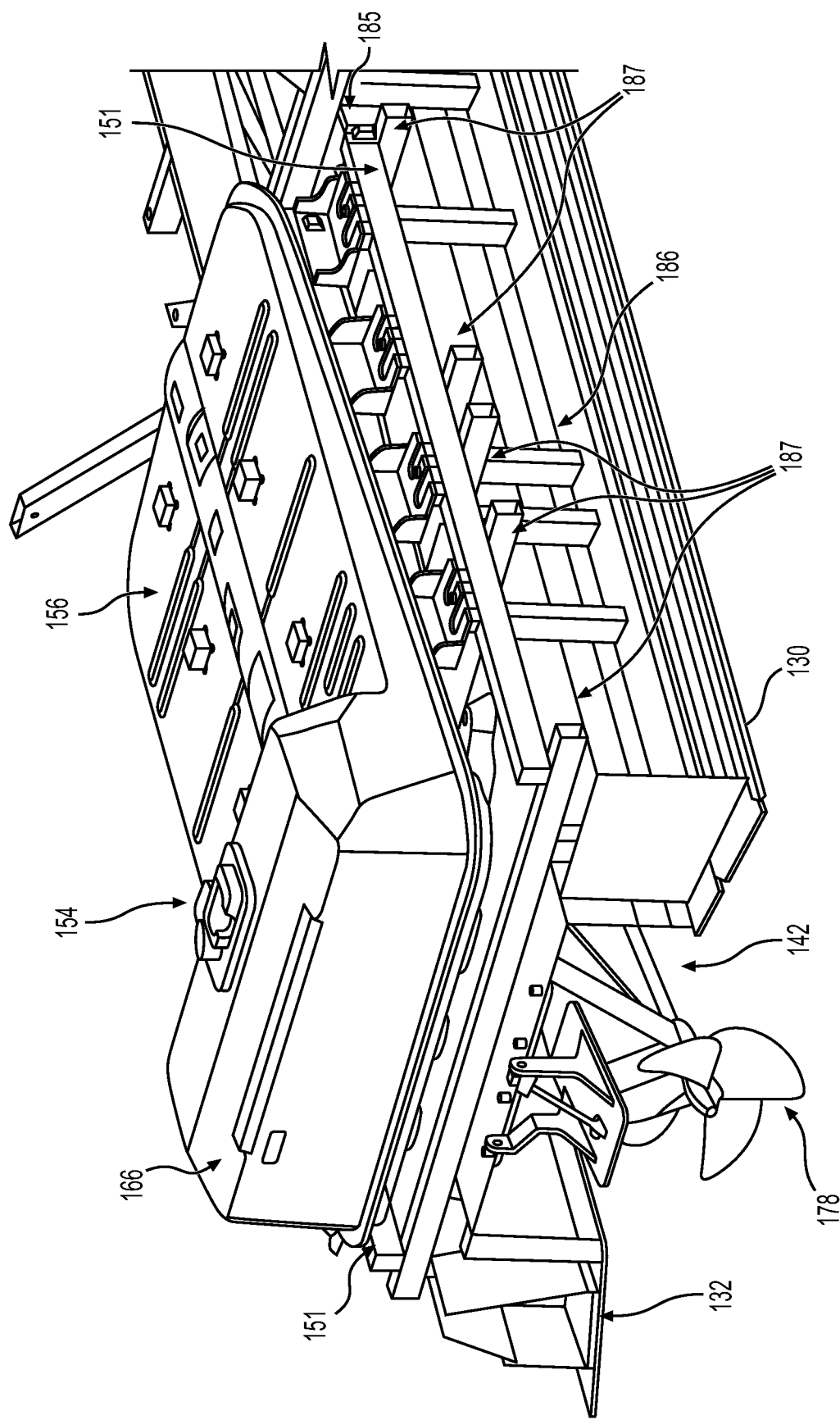
FIG. 10 is a rear, right side perspective view of portions of the hull and the electric propulsion system of FIG. 8.
Figure 11:
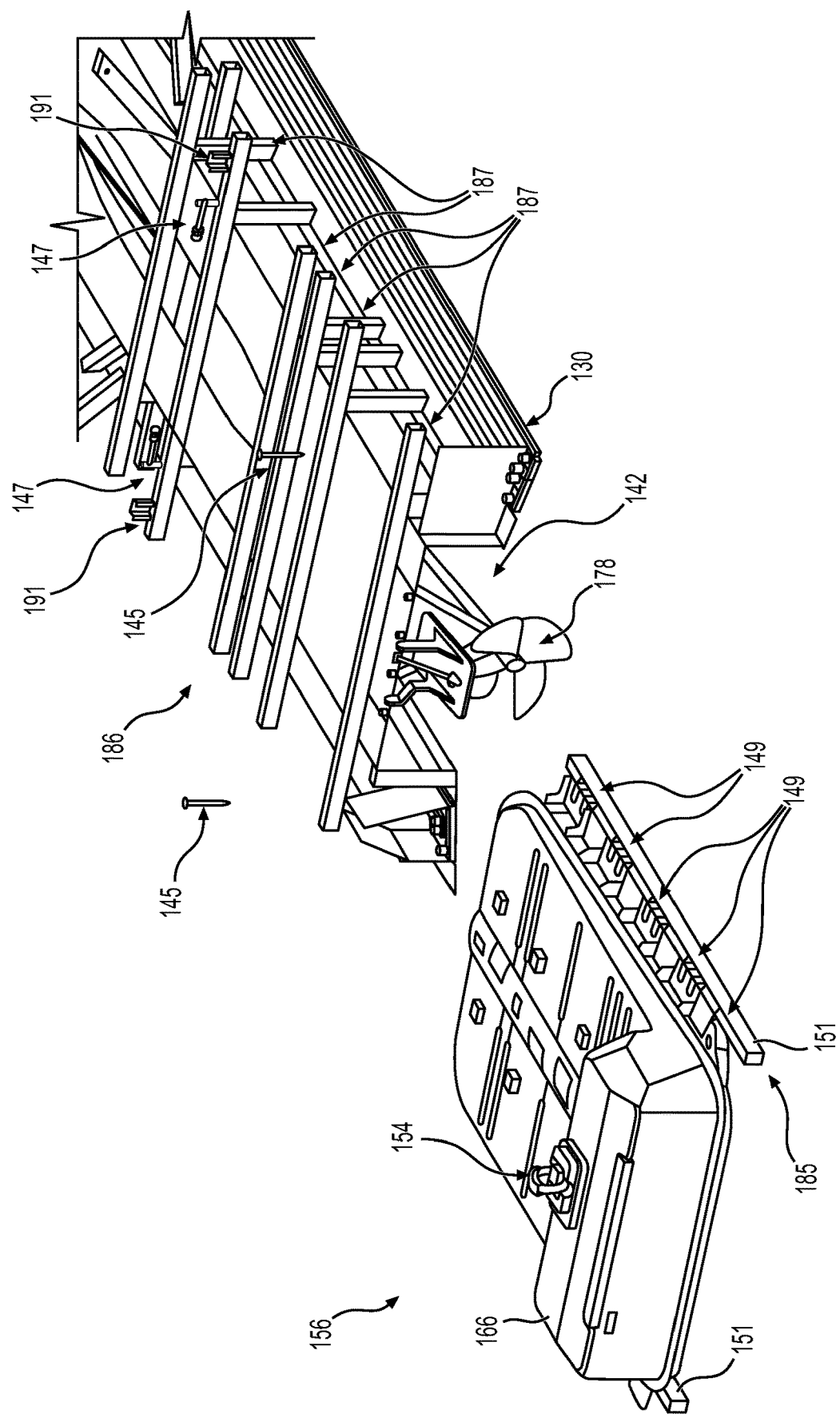
FIG. 11 is the rear, right side perspective view of the hull and portions of the electric propulsion system of FIG. 10, with the battery shown removed from the hull.

With additional reference to FIGS. 10 and 11, the battery 156 also includes a manual disconnect switch 154 for deactivating the battery 156. The switch 154 is disposed on the upper portion 166 such that the switch 154 can be operated while the battery 156 is installed in the watercraft 100 and without necessitating removal of the deck 120, for example. The exact placement of the switch 154 could change in different embodiments. The manual disconnect switch 154 is shown in the "off" position in FIGS. 9 and 11, where the battery 156 has been deactivated and is not supplying electricity to any power cables or wires connected thereto. The battery 156 is fully deactivated by removing the switch 154 from remaining portions of the battery 156 (not illustrated). The battery 156 is activated and providing electricity when the manual disconnect switch 154 is in the "on" position, illustrated in FIGS. 5 and 10.

The watercraft 100 also includes a battery support structure 186 connected to an internal surface of the hull 130 for receiving the battery 156 thereon. The support structure 186 is formed from five lateral risers 187 extending over the channel 142. It is contemplated that the support structure 186 could include more or fewer risers 187. It is also contemplated that in some embodiments the battery support structure 186 could be connected to or supported by the deck 120, in addition or alternative to being connected to the hull 130.

While in some embodiments the battery 156 could be received directly on the risers 187 of the support structure 186, in the present embodiment there is included a battery subframe 185 connected to the battery 156. The battery 156 and the subframe 185 are illustrated as connected to the support structure 186 in FIG. 10 and removed from the support structure in FIG. 11. The subframe 185 is selectively connected to the battery support structure 186 to secure the battery 156 to the hull 130. In the present embodiment, the battery subframe 185 includes a left riser 151 connected to a left side of the battery 156 and a right riser 151 connected to a right side of the battery 156. It is contemplated that the battery subframe 185 could be implemented in a variety of ways, including with more risers or a tray, or that the battery subframe 185 could be omitted.

As best seen in FIG. 9, the battery 156 is connected to the left riser 151 and the right riser 151 by a plurality of brackets 149. The battery 156 includes five brackets 149 on each side in the illustrated embodiment, but the number of brackets 149 could vary in different embodiments. Each bracket 149 includes a rubber mount for damping vibration transfer from the hull 130 to the battery 156. It is contemplated that one or more of the rubber mounts could be omitted in some embodiments.

The risers 151 of the subframe 185 are selectively fastened to the support structure 186, specifically to a forward most one of the lateral risers 187 and a rear most one of the lateral risers 187. Depending on the embodiment, the subframe 185 could be connected at different, or more or fewer points on the support structure 186. With reference to FIG. 11, rear portions of the risers 151 are fastened to the rear lateral riser 187 by two bolts 145. Forward portions of the risers 151 are fastened to the forward lateral riser 187 by two hitch pins 147 (also referred to as clevis pins 147) connecting to two brackets 191 extending upward from the forward most riser 187. Depending on the embodiment, different fasteners could be used in place of the bolts 145 and/or the hitch pins 147.

Figure 5:
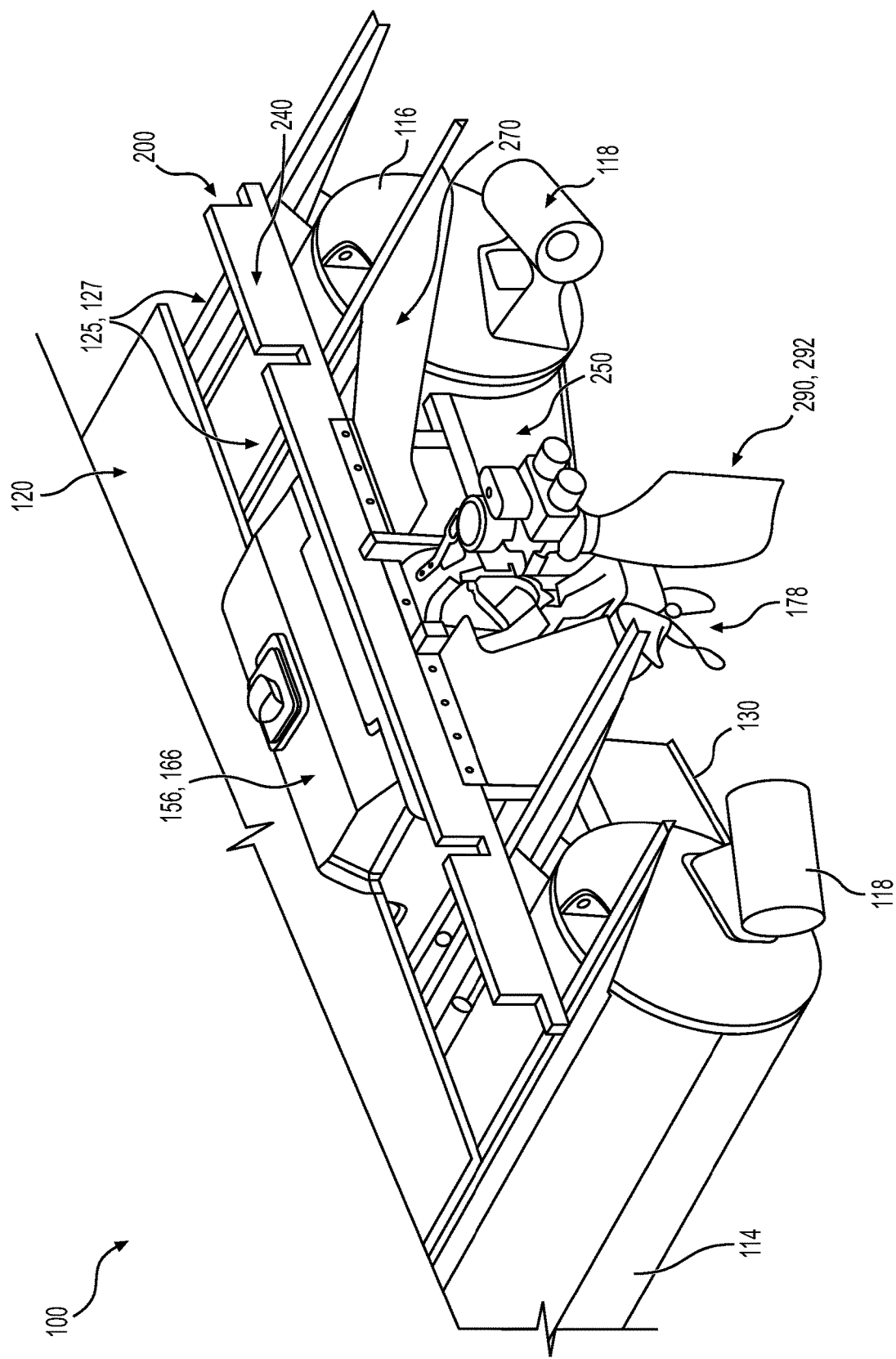
FIG. 5 is a close-up view of some rear portions of the watercraft of FIG. 1.

The rear module 200, the battery 156, the deck 120, and the hull 130 are arranged such that the battery 156 is selectively removable through the opening 230 when the rear module 200 is removed from the watercraft 100. When the rear module 200 is installed, the transom beam 240 is disposed rearward of the battery 156, specifically directly rearward of the upper portion 166 of the battery 156, as can be seen in FIG. 5. When the rear module 200 is removed, and the risers 151 are unfastened from the support structure 186, the battery 156 can be translated rearward out of the opening 230. Removal of the battery 156 and replacement of a new battery in the watercraft 100 is described in more detail below.

The propulsion system 150 further includes electric management and conversion components communicatively connected to the motor 152, as can be seen in FIG. 8. These components include a DC-DC converter 157 that provides current for the low voltage electronics and a charger unit 159 disposed to the right of the motor 152. The electronic components also include a regulator unit 161 that regulates power distribution, an inverter 162, a thruster system battery 163 for powering the thrusters 117, 118, and a boost converter 164 disposed to the left of the motor 152. The exact arrangement of the motor 152 and the electronic components 157, 159, 161, 162, 163, 164 could vary in different embodiments.

It is contemplated that the watercraft 100 could also include additional and/or alternative electronic or electrical components, for example, for controlling the propulsion system 150 and for managing operation of the watercraft 100. These components could include, but are not limited to, electronic cooling system, passenger accessory systems, navigation systems, watercraft control systems, and communication systems. It is also contemplated that some of the electronic and/or electrical components listed above could be omitted, such as the thruster system batter 163 and the boost converter 164.

The battery 156 is electrically and/or operatively connected to the electric motor 152 and the electronic components 157, 159, 161, 162, 163, 164 by a plurality of connection components 171 (FIG. 8). The connection components 171, depending on the embodiment, include one or more waterproof power supply cables, coolant hoses, charging cables, and digital communications cables. The battery 156 includes a plurality of connection points 155 for connecting the connection components 171 to the battery 156. The specific number and style of connection between the components 152, 157, 159, 161, 162, 163, 164 and the battery 156 could vary. In the illustrated embodiment, the battery 156 and the electric motor 152 are disposed vertically over the channel 142, although this could vary depending on the embodiment.

As is mentioned above, the deck 120 includes the access hatches 220, 225. The access hatch 220 is arranged partially over the motor 152 and the electronic components 157, 159, 161, 162 to selectively open to allow access to these components 152, 157, 159, 161, 162 and to one end of the connection components 171. It is contemplated that the access hatch 220 could be omitted in some embodiments. The access hatch 225, disposed rearward of the access hatch 220, partially vertically overlaps a space proximate to the battery 156. In the present embodiment, the hatch 225 vertically overlaps the battery 156, but this may not always be the case. The access hatch 225, when open, allows access to the connection points 155 and rear ends of the connection components 171. When the battery 156 needs to be replaced or simply removed from the watercraft 100, described in more detail below, the connection components 171 can be disconnected from the connection points 155 and the battery 156 by a user via the access hatch 225.

Figure 4:
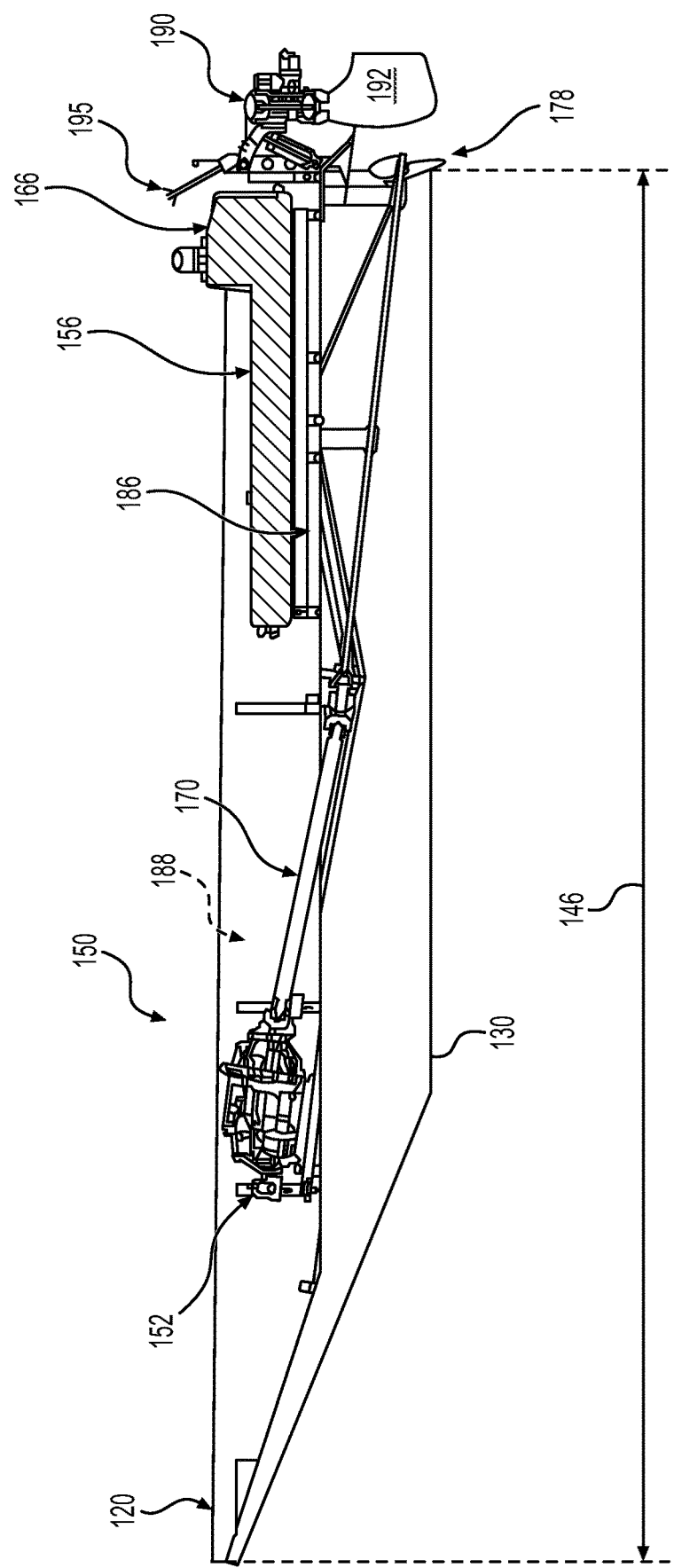
FIG. 4 is a cross-sectional view of the portions of the watercraft of FIG. 3 taken along a longitudinal and vertical plane.

With reference to FIG. 4, the propulsion system 150 also includes a propulsion shaft 170 operatively connected to the electric motor 152 for driving the propeller 178. A front end of the propulsion shaft 170 is connected and driven by the motor 152. From the front end at the motor 152, the propulsion shaft 170 extends downward and rearward from the motor 152 toward the rear end 104 of the watercraft 100 along a longitudinal center plane. The propulsion shaft 170 passes from inside the hull 130 outward into the channel 142, thereby connecting the motor 152 disposed inside the volume 188 to the propeller 178 arranged to be submerged when the watercraft 100 is in operation.

The propeller 178 is connected to and supported by the propulsion shaft 170. The propeller 178 is disposed generally rearward of the channel 142, although precise longitudinal placement of the propeller 178 could vary for different embodiments. The propeller 178 is a four blade, fixed-pitch propeller which rotates about a center of rotation 179, although the particular form of the propeller 178 could vary.

Figure 12:
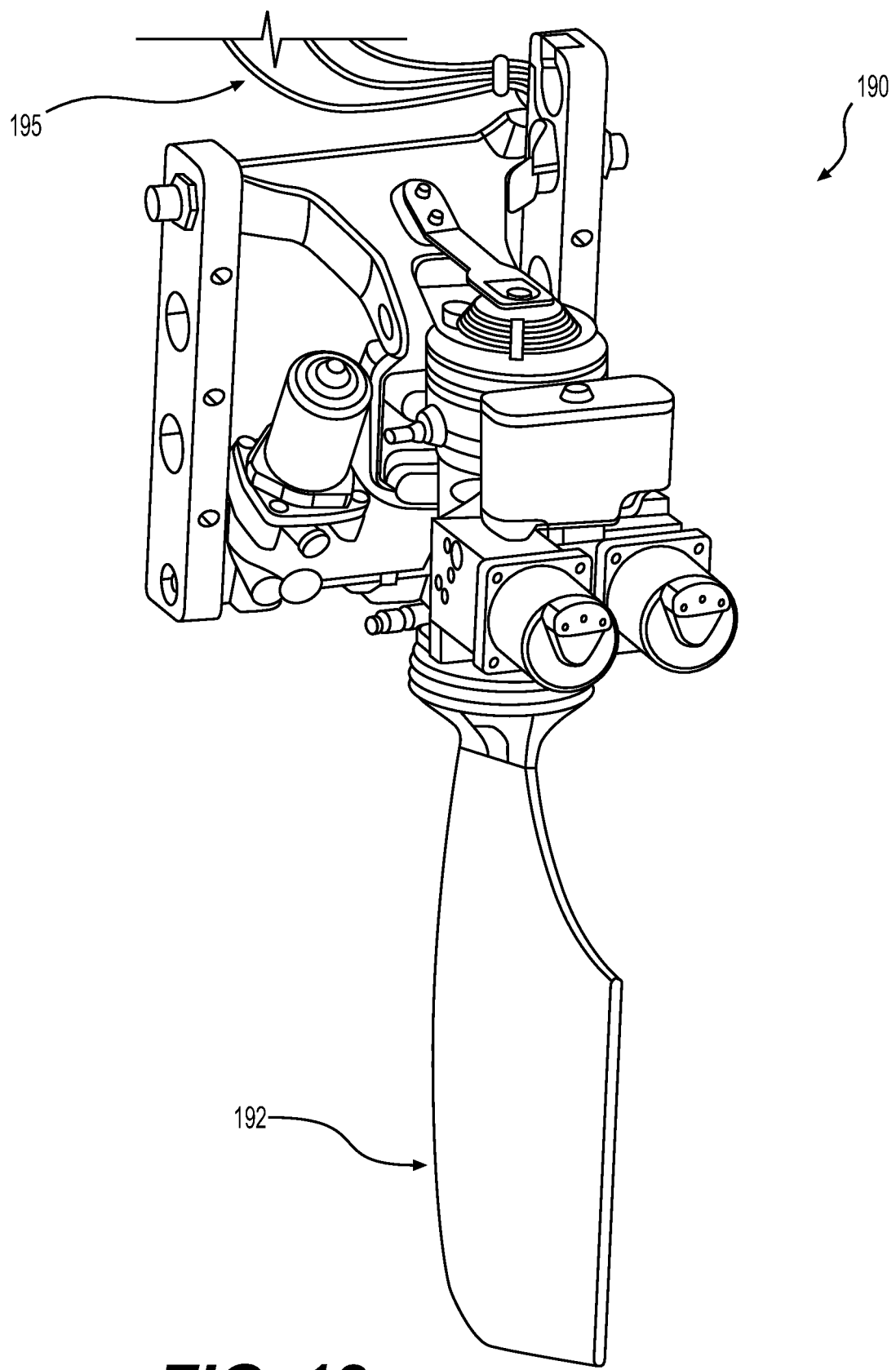
FIG. 12 is a rear, left perspective view of a rudder assembly of the watercraft of FIG. 1.

With additional reference to FIG. 12, the watercraft 100 also includes a rudder assembly 190 including a rudder 192 pivotally connected to a rear portion of the watercraft 100 behind the propeller 178. As can be seen in FIG. 5, the rudder assembly 190 assembly is selectively connected to the rear module 200 in the present embodiment. In some embodiments, the rudder 192 could be additionally or alternatively pivotally connected to a rear portion of the deck 120. The rudder assembly 190 also includes a plurality of wires 195 for operatively connecting the rudder assembly 190 to a steering wheel (not shown) on a command console 105 on the deck 120 for controlling the rudder 192. The rudder assembly 190 includes an electric motor that drives a hydraulic pump connected to a hydraulic actuator that controls the position of the rudder 192, although other ways of controlling the rudder 192 are contemplated. It is further contemplated that the steering wheel could be replaced by a handlebar in some embodiments.

Figure 13:
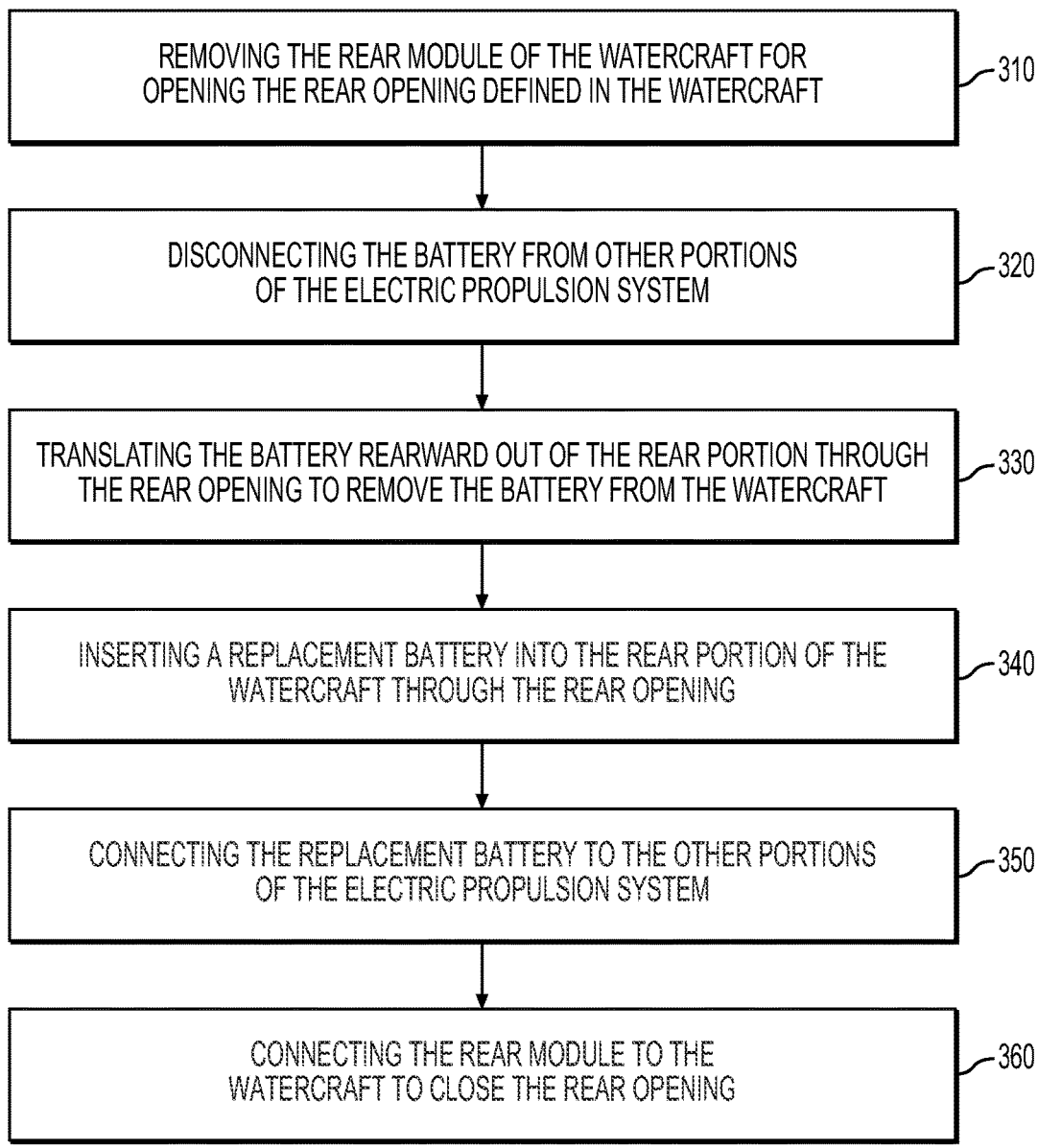
FIG. 13 is a flowchart illustrating a method for replacing the battery of the watercraft of FIG. 1.

With reference to FIG. 13, a method 300 for replacing the battery 156 according to non-limiting embodiments of the present technology is illustrated. While the present embodiment is described for removing the battery 156 through a rear opening, it is contemplated that the method 300 could also be implemented for removing and/or replacing a battery through a lateral side or front side opening in a watercraft.

The method 300 begins, at step 310, with removing the rear module 200 of the watercraft 100 in order to open the rear opening 230 defined in a rear portion of the watercraft 100. It is contemplated that the rear module 200 could be removably attached to the rest of the watercraft 100 in various ways, including but not limited to bolts and rivets. An embodiment of the rear module 200 being removably attached with rivets would require drilling out, and hence destroying, the original rivets. This can be done fairly easily and without damaging the rest of the structure, however, and thus is considered sufficiently "removable" for the purposes of the present technology. Other forms of non-destructive or minimally destructive connection means are also considered.

In at least some embodiments, the method 300 could further include, prior to removing the rear module 200, at least partially disconnecting the rudder assembly 190 from the watercraft 100. As is described above, the rudder assembly 190 is selectively connected to the rear module 200 and the wires 195 are connected to components (not shown) disposed on the deck 120. Before removing the rear module 200 (with the rudder assembly 190 connected thereto), the cables 195 are disconnected from the components disposed on the deck 120. In some embodiments, it is contemplated that the cables 195 could remain connected, and the rudder assembly 190 could be disconnected from the rear module 200 and placed on the deck 120 for example. It is also contemplated that the rudder assembly 190 and the cables 195 could be disconnected in order to remove the rear module 200 in some embodiments.

The method 300 continues, at step 320, with disconnecting the battery 156 from other portions of the electric propulsion system 150. To disconnect the battery 156 from the components 152, 157, 159, 161, 162, 163, 164, the connection components 171 are disconnected from the connection points 155 of the battery 156. In some such embodiments, disconnecting the battery 156 includes opening one or both of the hatches 220, 225 in order to access and disconnect the connection components 171.

In at least some embodiments, the method 300 could include disactivating the battery 156 prior to disconnecting the battery 156 from the other portions of the electric propulsion system 150, specifically from the components 152, 157, 159, 161, 162, 163, 164. To disactivate the battery 156, the manual disconnect switch 154 is moved from the "on" to the "off" position. In at least some embodiments, the battery 156 could be deactivated using the switch 154 prior to removing the rear module 200.

The battery subframe risers 151 are then unfastened from the support structure 186. In the present embodiment, the bolts 145 and the hitch pins 147 are removed to disconnect the subframe 185 from the support structure 186. The bolts 145 are accessed via the opening 230 and the cotter pins 147 are accessed via the access hatch 225.

The method 300 continues, at step 330, with translating the battery 156 rearward out of the rear portion through the rear opening 230 to remove the battery 156 from the watercraft 100. By positioning the battery 156 in a rear portion of the volume 188, the battery 156 only needs to be translated a relatively short distance to exit the watercraft 100. Rear placement of the battery 156 also reduces the number of components needing to be removed in order to create a clear path for the battery 156 to translate out. In view of the typical weight and size of such a battery for powering a watercraft, mechanical means for removing the battery 156 would generally be employed (for example a forklift).

Specific steps to removing the battery 156 could vary in different embodiments, depending on the structure for connecting the battery 156 to the hull 130 and/or the deck 120.

The method 300 continues, at step 340, with inserting a replacement battery into the rear portion of the watercraft 100 through the rear opening 230. Insertion and placement of the replacement battery is similarly generally performed using mechanical assistance, such as a forklift. When in position, the forward end of the risers 149 of the subframe 185 will abut the brackets 191, which thereby act as stoppers. The risers of the replacement battery are then fastened to the battery support structure 186 following inserting the replacement battery into the rear portion of the watercraft 100 using bolts 145 and hitch pins 147.

The method 300 continues, at step 350, with connecting the replacement battery to the other portions of the electric propulsion system 150. Rear ends of the connection components 171 are connected to connection points on the replacement battery.

The method 300 then terminates, at step 360, with connecting the rear module 200 to the watercraft 100 to close the rear opening 230. After either step 350 or 360, the replacement battery is reactivated using a manual switch of the replacement battery. It is also contemplated that the replacement battery may not be activated until the watercraft 100 is ready for use.

In embodiments of the method 300 requiring the rudder assembly 190 to be removed from the rear module 200 prior to disconnection of the rear module 200 from the hull 130, the method 300 would further include reconnecting the rudder assembly 190 to the rear module 200.

It is contemplated that the method 300 could include additional or different steps, either to perform additional functions and/or to perform the steps described above. It is also contemplated that the steps 310 and 320, and steps that may be included in different embodiments of the method 300, could be performed in an assortment of different sequences, depending on, for example, user preferences, and is not limited to the order set forth in the explanation above.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A watercraft comprising:
a hull;
a deck disposed above the hull;
an electric propulsion system including:
a battery disposed in a rear portion of the watercraft at least partially between the hull and the deck, the battery having an elongated shape extending along a longitudinal direction of the watercraft, and
an electric motor electrically connected the battery;
an opening defined at least in part by at least one of a stern end portion of the hull and a stern end portion of the deck, the opening providing access to a space between the hull and the deck, the opening being sized to permit the passage of the battery therethrough; and
a rear module extending at least substantially vertically and selectively removable from at least one of the stern end portion of the hull and the stern end portion of the deck, the rear module selectively closing the opening, the rear module defining a stern-side surface of the watercraft,
the rear module, the battery, the deck, and the hull being arranged such that the battery is selectively removable by translating the battery longitudinally sternward and substantially parallel to the deck and out through the opening when the rear module is removed from the watercraft.

2. The watercraft of claim 1, further comprising at least one access hatch defined in the deck, the access hatch being arranged to selectively open to allow access to at least one connection point on the battery.

3. The watercraft of claim 2, wherein the at least one access hatch at least partially vertically overlaps a space proximate to the battery.

4. The watercraft of claim 2, further comprising a plurality of connection components connecting the battery to other portions of the electric propulsion system, at least one of the plurality of connection components connecting to the battery at the at least one connection point.

5. The watercraft of claim 4, wherein the plurality of connection components includes at least one of a power cable, a coolant hose, a charging cable, and a digital communications cable.

6. The watercraft of claim 1, further comprising a battery support structure connected to at least one of the hull and the deck, the battery being received on the battery support structure.

7. The watercraft of claim 6, further comprising at least one battery subframe connected to the battery, the at least one battery subframe being selectively connected to the battery support structure.

8. The watercraft of claim 7, wherein:
the at least one battery subframe includes:
a left riser connected to a left side of the battery, and
a right riser connected to a right side of the battery;
the left riser is selectively fastened to a left side of the battery support structure by at least one left fastener; and
the right riser is selectively fastened to a right side of the battery support structure by at least one right fastener.

9. The watercraft of claim 8, wherein:
the battery is connected to the left riser and the right riser by a plurality of brackets; and
at least one of the plurality of brackets includes a rubber mount for damping vibration transfer to the battery.

10. The watercraft of claim 1, wherein the rear module includes:
a transom plate for covering the opening; and
a transom beam connected to the transom plate.

11. The watercraft of claim 10, further comprising:
at least one left longitudinal rigid member connected to and extending longitudinally along a left, top side of the hull;
at least one right longitudinal rigid member connected to and extending longitudinally along a right, top side of the hull; and
the transom beam is connected to the at least one left longitudinal rigid member and the at least one right longitudinal rigid member.

12. The watercraft of claim 1, wherein a longitudinal length of the hull is at least 4 meters.

13. The watercraft of claim 12, wherein the longitudinal length of the hull is less than 10 meters.

14. The watercraft of claim 1, further comprising a pair of pontoon tubes connected to at least one of the hull and the deck.

15. The watercraft of claim 1, wherein the battery includes a manual disconnect switch for deactivating the battery.

16. A method for replacing a battery of an electric propulsion system in a watercraft, the method comprising:
removing a rear module of the watercraft for opening a rear opening defined in a stern end portion of the watercraft;
disconnecting the battery from other portions of the electric propulsion system;
translating the battery longitudinally sternward and substantially parallel to the deck and out of the rear portion through the rear opening to remove the battery from the watercraft;
inserting a replacement battery into the rear portion of the watercraft through the rear opening;
connecting the replacement battery to the other portions of the electric propulsion system; and
connecting the rear module to the watercraft to close the rear opening and form a stern-side surface of the watercraft.

17. The method of claim 16, further comprising, prior to translating the battery longitudinally sternward, unfastening at least one battery riser from a battery support structure, the at least one battery riser being connected to the battery, the battery support structure being connected to and supported by the hull.

18. The method of claim 17, wherein:
the at least one battery riser includes a first riser and a second riser; and
unfastening the at least one battery riser from the battery support structure includes:
removing two fasteners connecting the first riser to the battery support structure, and
removing two fasteners connecting the second riser to the battery support structure.

19. The method of claim 18, further comprising, following inserting the replacement battery into the rear portion:
fastening a first replacement battery riser to the battery support structure; and
fastening a second replacement battery riser to the battery support structure.

20. The method of claim 16, further comprising disactivating the battery prior to disconnecting the battery from the other portions of the electric propulsion system.

* * * * *